(12) United States Patent
Srinivas et al.

(10) Patent No.: US 9,401,992 B2
(45) Date of Patent: Jul. 26, 2016

(54) SYSTEMS AND METHODS FOR SELECTIVELY ROUTING CALLS TO A CALL CENTER

(75) Inventors: Sharath Srinivas, Bangalore (IN); Bo Hu, Pittsford, NY (US); Johannes A. Koomen, Avon, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/551,263

(22) Filed: Jul. 17, 2012

(65) Prior Publication Data

US 2014/0023186 A1   Jan. 23, 2014

(51) Int. Cl.
*H04M 3/523* (2006.01)

(52) U.S. Cl.
CPC ........ *H04M 3/5232* (2013.01); *H04M 2201/14* (2013.01); *H04M 2201/18* (2013.01); *H04M 2203/402* (2013.01)

(58) Field of Classification Search
CPC . H04M 3/523; H04M 3/5232; H04M 3/5238; H04M 3/5166; H04M 3/5231; H04M 2203/551
USPC ............. 379/265.01, 265.02, 266.01, 266.03, 379/266.05, 266.08
See application file for complete search history.

(56) References Cited

U.S. PATENT DOCUMENTS

| | | | | |
|---|---|---|---|---|
| 5,999,965 | A * | 12/1999 | Kelly | ............................ 709/202 |
| 6,621,901 | B1 * | 9/2003 | Gruia et al. | .............. 379/266.07 |
| 6,975,720 | B1 | 12/2005 | Crook | |
| 7,672,746 | B1 * | 3/2010 | Hamilton et al. | ............. 700/100 |
| 7,953,217 | B2 | 5/2011 | Fain et al. | |
| 8,036,682 | B1 | 10/2011 | Davis et al. | |
| 8,300,798 | B1 * | 10/2012 | Wu et al. | ................... 379/265.11 |
| 8,379,830 | B1 * | 2/2013 | Naik et al. | ................ 379/265.02 |
| 2002/0184069 | A1 * | 12/2002 | Kosiba | .................... G06Q 10/04 705/7.38 |
| 2004/0028211 | A1 * | 2/2004 | Culp et al. | ............... 379/265.01 |
| 2008/0225872 | A1 * | 9/2008 | Collins | ............... H04M 3/5232 370/412 |
| 2009/0202056 | A1 * | 8/2009 | Raghav et al. | ........... 379/142.04 |
| 2010/0322406 | A1 | 12/2010 | Foster et al. | |
| 2012/0224680 | A1 * | 9/2012 | Spottiswoode et al. | . 379/265.12 |
| 2012/0321070 | A1 * | 12/2012 | Smith et al. | .............. 379/265.09 |

OTHER PUBLICATIONS

Bertsimas et al., "Simulated Annealing", Statistical Science, 1993, vol. 8, No. 1, pp. 10-15.
Armony et al., "Contact Centers with a Call-Back Option and Real-Time Delay Information", Operations Research, vol. 52, No. 4, Jul.-Aug. 2004, pp. 527-545.

* cited by examiner

*Primary Examiner* — Ahmad F Matar
*Assistant Examiner* — Jirapon Intavong
(74) *Attorney, Agent, or Firm* — Fox Rothschild LLP

(57) ABSTRACT

Systems and methods of routing calls may include receiving a plurality of calls, and for each of the plurality of calls, determining a threshold time that may be a maximum service time for the call, estimating an expected service time for the call, comparing the threshold time with the expected service time for the call, and assigning the call into one of a plurality of queues based upon the comparing. The method of routing may further include prioritizing the plurality of queues based upon the expected service time for each call in each of the plurality of queues, directing each call in a first queue of the plurality of queues to a first group of agents, and providing a callback prompt to each call in a second queue of the plurality of queues, wherein a priority of the first queue is higher than a priority of the second queue.

32 Claims, 6 Drawing Sheets

SYSTEMS AND METHODS FOR SELECTIVELY ROUTING CALLS TO A CALL CENTER

BACKGROUND

Call centers usually maintain optimal staffing levels so as to minimize wait times for customers who call in and are placed on hold, while at the same time minimizing the amount of call center agents necessary. However, call arrival patterns can quickly fluctuate from low call volumes to high call volumes in a very short period of time, a phenomenon known as "bursty" call patterns. Additionally, the call length may vary from a short duration to a longer period of time. When the call volume becomes bursty, the increase in activity has an impact on the wait times for all of the calls, regardless of the estimated length of each call, while customers wait for an agent to assist them. At times, it can be a long wait for an available agent, and higher wait times generally result in low customer satisfaction.

Accordingly, a need exists for methods and systems that can effectively manage calls during periods of low call volume and high call volume, as well as a fluctuation between the two periods, regardless of the estimated call lengths of each call.

SUMMARY

In an embodiment, method of routing calls may include receiving, by a processing device, a plurality of calls. Each of the plurality of calls may include determining, by the processing device, a threshold time that may be a maximum service time for the call, estimating, by the processing device, an expected service time for the call, comparing, by the processing device, the threshold time with the expected service time for the call, and assigning, by the processing device, the call into one of a plurality of queues based upon the comparing. The method of routing may further include prioritizing, by the processing device, the plurality of queues based upon the expected service time for each call in each of the plurality of queues, directing, by the processing device, each call in a first queue of the plurality of queues to a first group of agents, and providing, by the processing device, a callback prompt to each call in a second queue of the plurality of queues, wherein a priority of the first queue is higher than a priority of the second queue.

In an embodiment, a system for routing calls may have a processor and a non-transitory, processor-readable storage medium in operable communication with the processor, wherein the storage medium may have one or more programming instructions that, when executed, cause the processor to receive a plurality of calls, and for each of the plurality of calls, determine a threshold time that may be a maximum service time for the call, estimate an expected service time for the call, compare the threshold time with the expected service time for the call, and assign the call into one of a plurality of queues based upon the comparing. The programming instructions that, when executed, cause the processor to further prioritize the plurality of queues based upon the expected service time for each call in each of the plurality of queues, direct each call in a first queue of the plurality of queues to a first group of agents, and provide a callback prompt to each call in a second queue of the plurality of queues, wherein a priority of the first queue is higher than a priority of the second queue.

In an embodiment, a system for routing calls may have a processor, a non-transitory, processor-readable storage medium in operable communication with the processor, a router in operable communication with the processor, and a communications port in operable communication with the processor. The storage medium may have one or more programming instructions that, when executed, cause the processor to direct the communications port to receive a plurality of calls. For each of the plurality of calls, the programming instructions that, when executed, direct the processor to determine a threshold time that may be a maximum service time for the call, cause an interactive voice response system to obtain an input from a callers placing the call, determine the nature of the call based upon the input, compare the nature of the call to a statistical database, based upon the comparing, estimate an expected service time for the call, compare the threshold time to the expected service time, and direct the router to assign the call into one of a plurality of queues. The storage medium may have one or more programming instructions that, when executed, may further cause the processor to prioritize the plurality of queues based upon the expected service time for each call in each queue, direct each call in a first queue of the plurality of to a first group of agents, and direct the communications port to provide a callback prompt to each call in a second queue of the plurality of queues, wherein a priority of the first queue is higher than a priority of the second queue.

DETAILED DESCRIPTION

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

The following terms shall have, for the purposes of this application, the respective meanings set forth below.

As used herein, the terms "sum," "product" and similar mathematical terms are construed broadly to include any method or algorithm in which a single datum is derived or calculated from a plurality of input data.

A "computing device" refers to a computer, a processor and/or any other component, device or system that performs one or more operations according to one or more programming instructions. An illustrative computing device is described in FIG. 4.

A "call" refers to any type of electronic communication with the use of an electronic device. Examples of calls may include communications conducted by landline telephone, cellular telephone, voice over internet protocol (VoIP), facsimile transmissions, short message service (SMS), multimedia messaging service (MMS), simple mail transfer protocol over transmission control protocol/internet protocol (SMTP over TCP/IP), instant messaging, video messaging, video chat and/or other communications protocols now known or later developed.

A "queue" refers to an organized sequence of items, such as calls, that wait for an action, such as the answering of a call by a call center agent. The organized sequence may generally be arranged as a sequence of items in the order they are received and/or routed from other components; i.e., the first call received is placed at the beginning of the queue, and subsequent calls that are received are placed in the queue behind the previous most recently received call. As an alternative, calls may be placed in the queue based on priority; i.e., calls of a higher priority are placed at the beginning of the queue, and calls in descending priority are placed behind calls of higher priority in the queue.

Figure 1:
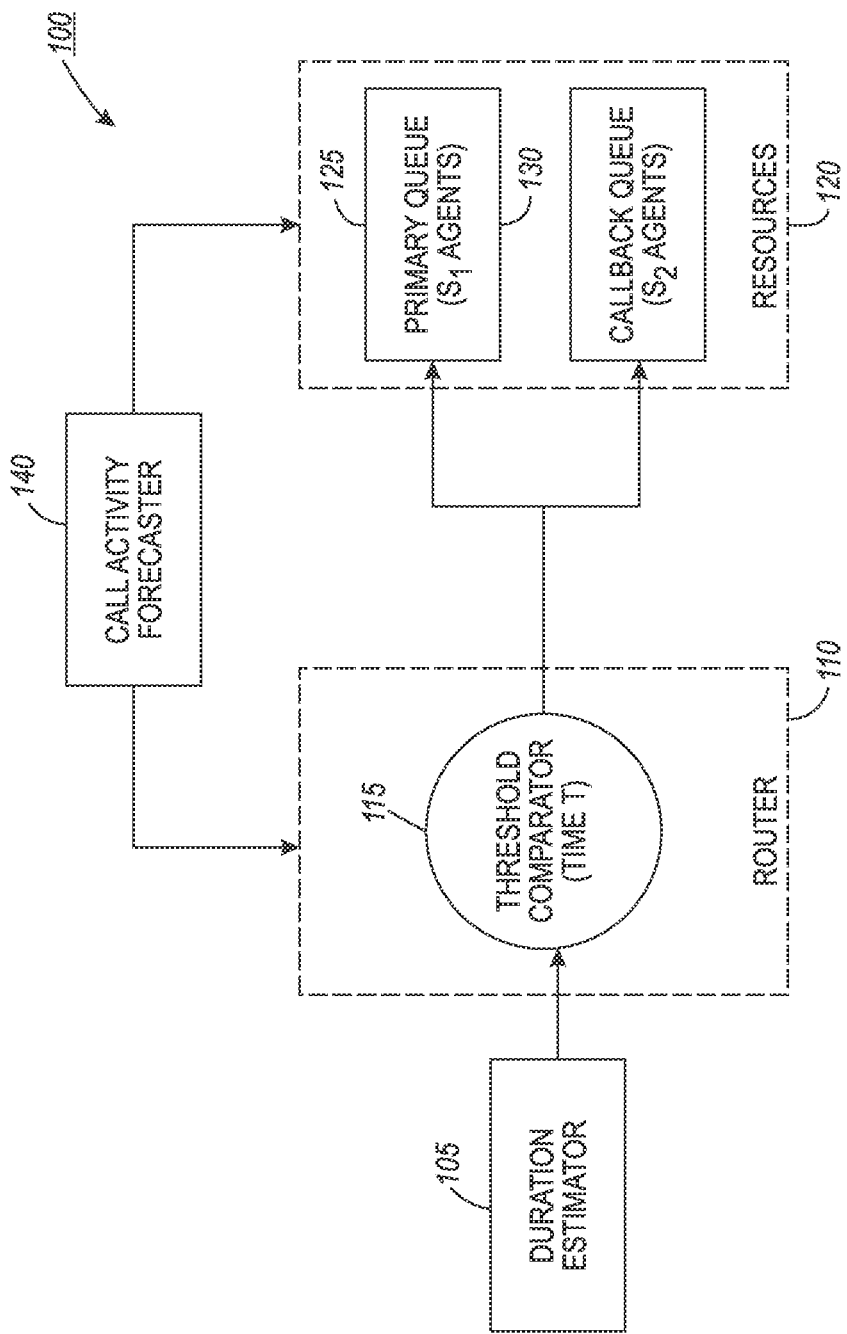
FIG. 1 depicts a schematic representation of call routing in accordance with an embodiment.

The present disclosure pertains to methods and systems for creating one or more call queues during periods of varying call volumes. FIG. 1 shows a representation of a call center routing schematic, generally designated 100, in accordance with an embodiment. The schematic may be contained as a group of elements within a software program loaded onto a computing device, as a group of hardware elements within the computing device or any combination thereof for use as a system for routing calls from a main source to a queue. The schematic includes a duration estimator 105, a router 110 and a number of resources 120.

The number of resources 120 may include two or more queues, as discussed in more detail herein. In the present disclosure, two queues are used: a primary queue 125 and a callback queue 130. The primary queue 125 may be staffed by a first number of agents $S_1$, and the callback queue 130 may staffed by a second number of agents $S_2$.

The first number of agents $S_1$ and the second number of agents $S_2$ each may be dynamic. Accordingly, the first number of agents $S_1$ and the second number of agents $S_2$ may fluctuate over a period of time as a need for agents to service the primary queue 125 increases or decreases and as a need for agents to service the callback queue 130 increases or decreases. The respective needs may be directly or indirectly related to any number of factors including, but not limited to, staffing during a particular time period, call volumes and/or the like.

The number chosen for the first number of agents $S_1$ at any given time may be directly or indirectly related to one or more of the following: the second number of agents $S_2$, a total number of agents, the volume of calls, and the expected length of calls. Additionally, the number chosen for the second number of agents $S_2$ at any given time may be directly or indirectly related to one or more of the following: the first number of agents $S_1$, a total number of agents, the volume of calls, and the expected length of calls. Thus, agents tasked with servicing the primary queue 125 may be re-tasked to service the callback queue 130 at any given time, and agents tasked with servicing the callback queue 130 may be re-tasked to service the primary queue 125 at any given time.

The duration estimator 105 may estimate the service time of each call received by the call center. The estimation of the amount of service time necessary for each individual call may be completed by any method now known or later developed in the art, such as, for example, utilizing an automated system, such as an interactive voice response (IVR) system, to gain preliminary information from a customer. The automated system may request a customer's identifying information, such as name, date of birth, address, account number and/or the like, and then may access a database to obtain records of the customer's previous call history. Alternatively, the automated system may provide a menu prompt to the customer that asks the customer a series of questions and obtains the nature of the customer's call based on the responses to those questions.

Once the nature of the call is determined, the system may refer to a statistical database that comprises statistics obtained from previous calls to obtain an estimation of the amount of time necessary for the type of call. Examples of such statistics may include an average amount of time for calls of a similar nature, average amount of time for calls with a particular customer, average amount of calls for a particular agent, time of day and/or other parameters known to those skilled in the art.

The router 110 may route calls by utilizing a threshold comparator 115 that designates a threshold time T and determines whether each call service duration is greater than or equal to the threshold time T.

The threshold time T may generally be a designated amount of time that is used as a separating line for identifying two or more classes of calls. In instances where two classes of calls are distinguished by the threshold, the two classes may generally be a first class for calls that can be resolved in a short period of time (short calls) and a second class for calls that can be resolved in an extended period of time (long calls). For example, if the threshold is calculated to be a value of T seconds, then calls that are estimated to be resolved in less than T seconds are identified as being one of the first class of short calls and calls that are estimated to be resolved in more than T seconds are identified as being one of the second class of long calls. The calculation of the current threshold may be completed by accessing an algorithm, as described in more detail herein.

The threshold time T may generally be measured in seconds and may range from a value of zero seconds to a value such as about 1,000 seconds, about 5,000 seconds, about 10,000 seconds or the like. While T is generally described in seconds herein, other units of time may also be used, including, but not limited to milliseconds, minutes, hours and days.

During periods of regular call activity, the threshold time T may generally be set to a very high value, such as, for example, 10,000 seconds or more. Periods of regular call activity may be defined by the reception of a number of calls that can be immediately answered. Thus, periods of regular call activity may fluctuate based on the staffing of the call center, and the threshold time T may be a fluid value and not static.

When the value of the threshold time T is set to the very high value, it may ensure that very few or none of the calls received are routed to the callback queue 130. This is because the time estimated by the duration estimator 105 for each call may be less than the threshold time T. Thus, the callback queue 130 may be assigned a small second number of agents $S_2$, such as an $S_2$ value of zero (0). Accordingly, all of the calls may be directed from the router 110 to the primary queue 125, and thus the primary queue 125 may have a first number of agents $S_1$ that is greater than 0.

During periods of increased call activity or when the call activity is bursty, the threshold time T may be reduced to a value, such as, for example, a value less than 10,000 seconds. Periods of increased call activity may be defined by the reception of a number of calls that cannot be immediately answered.

When the value of the threshold T is set to the lower value, it may ensure that some of the calls received by the call center are directed to the callback queue 130, and some of the calls are directed to the primary queue 125. This is because the time estimated by the duration estimator 105 for each call may be more than, equal to or less than the threshold time T. During these periods, the primary queue 125 may be assigned a first number of agents $S_1$ that is greater than zero (0), and the callback queue 130 may also be assigned a second number of agents $S_2$ that is greater than zero (0).

A call activity forecaster 140 may be used to conduct a forecasting process, which may be used to predict or anticipate the call volume at specified intervals throughout a day, a week, a month, and the like. Examples of such intervals may include, but are not limited to, 30 minutes, hourly, every 2 hours, every 4 hours, or every 8 hours. The call activity forecaster 140 may further use an analytical model of past call activity to forecast future call activity. The analytical model may take into consideration long range historical patterns as well as quick turnaround patterns such as the activity in the most recently completed interval of time.

Figure 2:
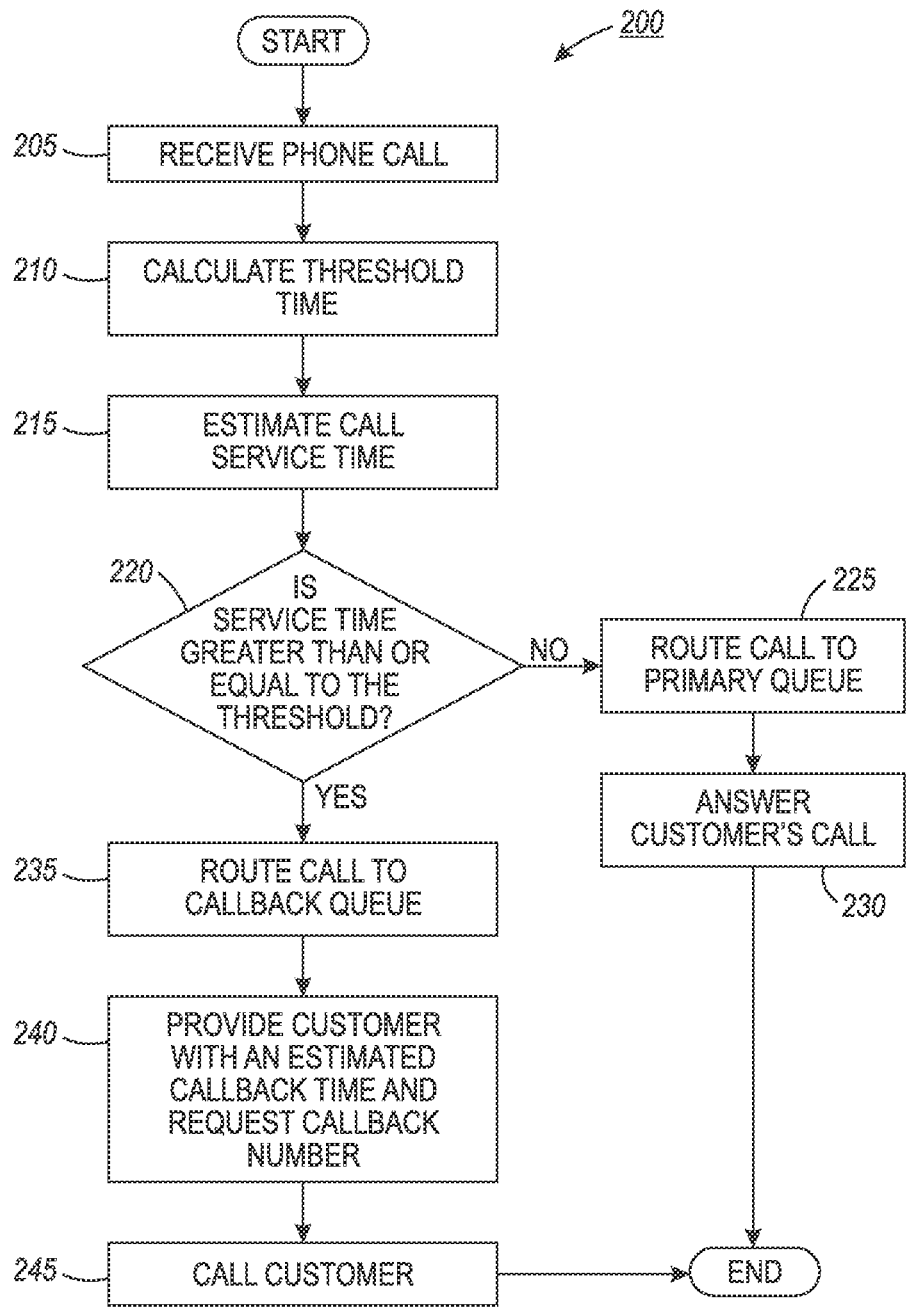
FIG. 2 depicts a flow chart of call routing in accordance with an embodiment.

FIG. 2 depicts a flow diagram, generally designated 200, of a call center queue process in accordance with an embodiment. The operations disclosed in FIG. 2 may generally be performed by executing a software program stored in a memory of a computing system, as described in more detail herein. The process may further direct the computing system, components of the computing system or other devices in communication with the computing system to perform the operations.

First, a call center or other entity may receive a call 205. The call may be received at a main number, website, screen name and the like, or may be transferred from another number, website, screen name and the like.

At the time the call is received, the program may calculate a current threshold time 210 of all of the calls in the queue and then may estimate the amount of service time necessary 215 to complete the call based upon the nature of the call.

As previously described herein, the call may be any type of electronic communication made by a customer, client or the like to a call center. However, communications between other parties in accordance with the present disclosure are also anticipated. The nature of the call is not limited by this disclosure and may be for any purpose, such as requesting and receiving customer support, requesting and receiving technical support, returning calls, purchasing items or inquiring about products or services.

Once the estimation has been completed, a determination is made as to whether the service time is greater than or equal to the threshold time 220. If the service time is greater than or equal to the threshold, the call may then be routed to the callback queue 235.

The callback queue may generally be a queue for the long calls class, for which calls are estimated to take an amount of time that is greater than or equal to the threshold. callers with calls routed to the callback queue may be notified that, due to high call volumes, their call will be returned by an agent 240. The notification may be pre-recorded and may optionally include an estimated time within which the call will be returned, an estimated amount of time that may elapse before the call is returned and/or other pertinent information relating to the callback. The notification may further contain a prompt to obtain a callback number for the customer, which may request the customer to key in his/her phone number or confirm that a number on file is correct.

Once the notification has been provided and a number has been obtained or confirmed, the system may then disconnect the call. At an appropriate time thereafter, such as when call volumes diminish or when one of the agents assigned or re-assigned to the callback queue becomes available, an agent may return the call to the customer 245 using the callback number previously provided or confirmed.

If the service time is less than the threshold, the call may be routed to the primary queue 225. When a customer's call is routed to the primary queue, the system may notify the customer that his call has been placed in the queue and will be answered in the order it was received. The notification may further provide an estimated time that the customer will be connected to an available agent, or may provide the customer with a queue number that indicates the customer's position in the queue. Once the call is routed to the primary queue and reaches the front of the queue, the next available agent may answer the call 230.

Figure 3:
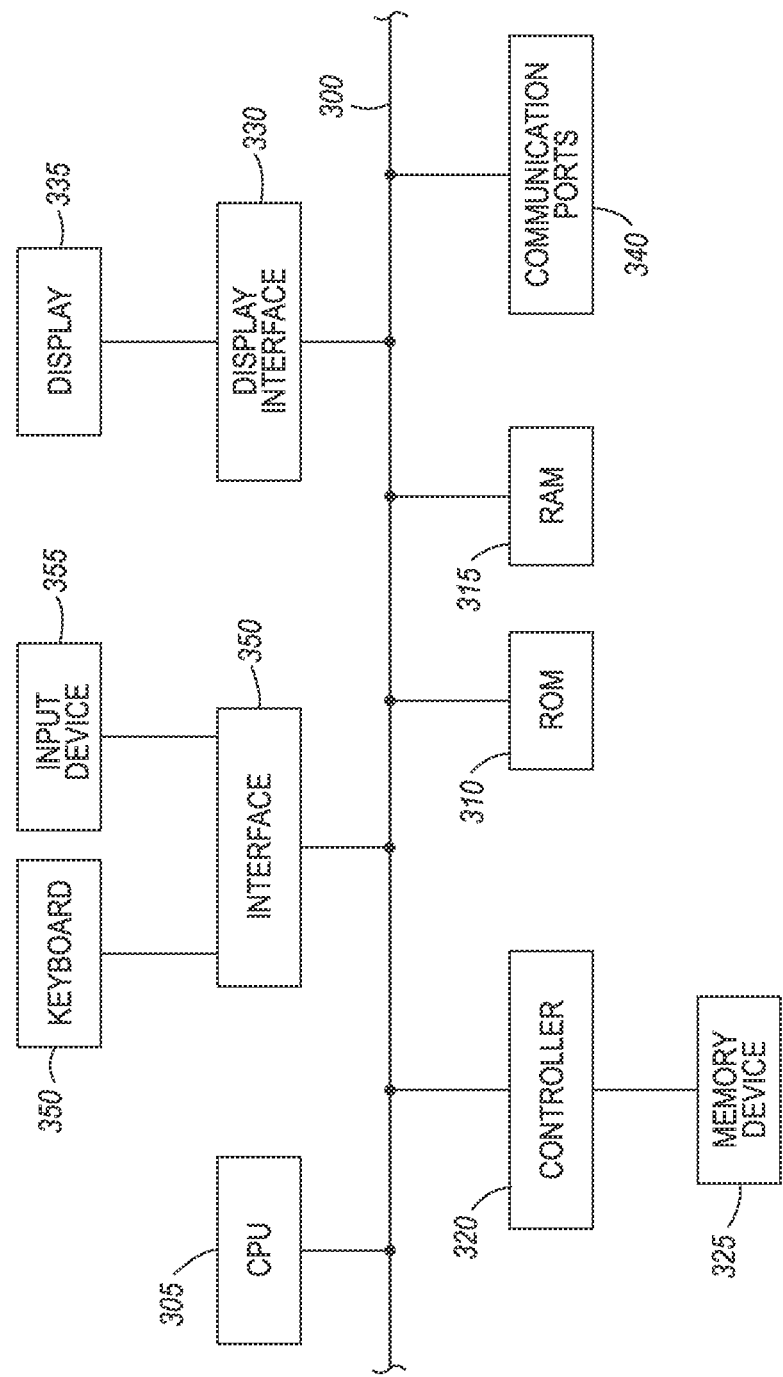
FIG. 3 depicts a block diagram of illustrative internal hardware that may be used to contain or implement program instructions according to an embodiment.

FIG. 3 depicts a block diagram of illustrative internal hardware that may be used to contain or implement program instructions, such as the process steps discussed above in reference to FIGS. 1 and 2, according to embodiments. A bus 300 serves as the main information highway interconnecting the other illustrated components of the hardware. CPU 305 is the central processing unit of the system, performing calculations and logic operations required to execute a program. CPU 305, alone or in conjunction with one or more of the other elements disclosed herein, is an illustrative processing device, computing device or processor as such terms are used within this disclosure. Read only memory (ROM) 310 and random access memory (RAM) 315 constitute illustrative memory devices (i.e., processor-readable non-transitory storage media).

A controller 320 interfaces with one or more optional memory devices 325 to the system bus 300. These memory devices 325 may include, for example, an external or internal DVD drive, a CD ROM drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 310 and/or the RAM 315. Optionally, the program instructions may be stored on a tangible computer readable medium such as a compact disk, a digital disk, flash memory, a memory card, a USB drive, an optical disc storage medium, such as a Blu-ray™ disc, and/or other non-transitory storage media.

An optional display interface 330 may permit information from the bus 300 to be displayed on the display 335 in audio, visual, graphic or alphanumeric format. Communication with external devices, such as a print device, may occur using various communication ports 340. An illustrative communication port 340 may be attached to a communications network, such as the Internet or an intranet.

The hardware may also include an interface 350 which allows for receipt of data from input devices such as a keyboard 360 or other input device 355 such as a mouse, a joystick, a touch screen, a remote control, a pointing device, a video input device and/or an audio input device.

Figure 4:
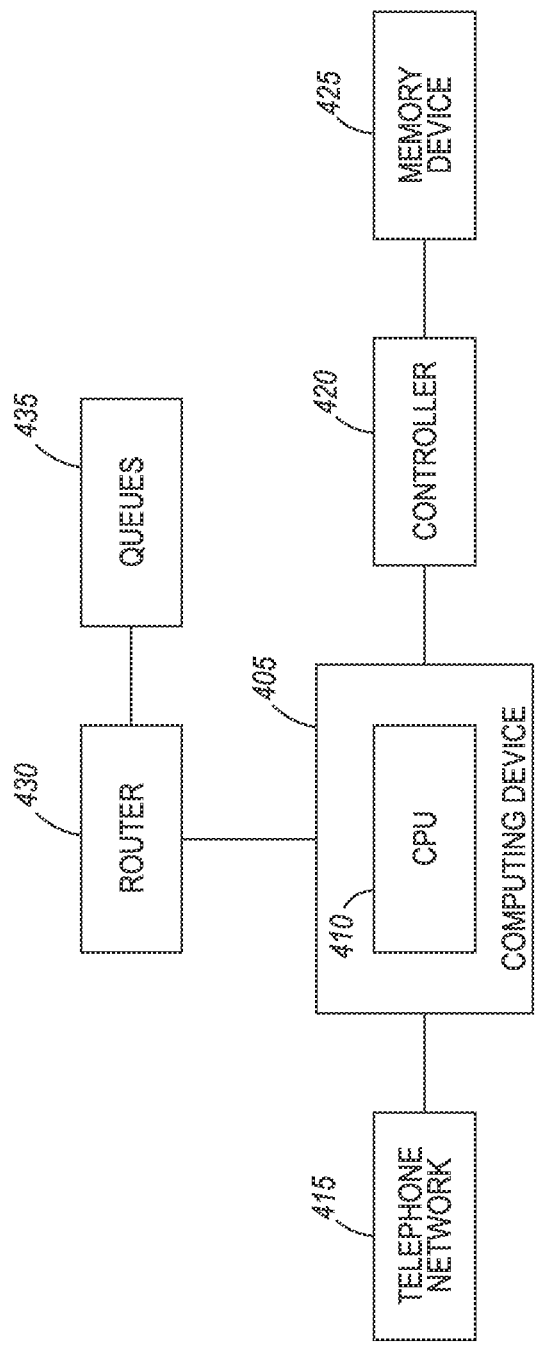
FIG. 4 depicts a block diagram of an illustrative system for call routing according to an embodiment.

FIG. 4 depicts a block diagram of an illustrative system for routing calls according to an embodiment. As shown in FIG. 4, a central processing unit 410 may be contained within a computing device 405. The computing device 405 may serve as a primary device that directs the flow of calls as they are received. In this embodiment, the computing device 405 may be in direct communication with a controller 420, which may further contain a memory device 425. Alternatively, the controller 420 and/or the memory device 425 may be located within the computing device 405, in addition to the CPU 410. The memory device 425 may contain program instructions that are sent to the computing device 405 via the controller 420. The computing device 405 may also be connected to a telephone network 415, which may be directed by the computing device 405 to receive incoming calls. The computing device 405 may then direct a router 430 to assign each of the incoming calls from the telephone network 415 to one or more queues 435, as described in more detail herein.

As previously directed in reference to FIG. 1, the variables T, $S_1$ and $S_2$ for threshold, primary queue staffing and callback queue staffing respectively, may have optimal values based upon a dynamic queue algorithm, as disclosed below:

$$\text{Minimize}_{\{T, S_1, S_2\}} (J),$$

Subject to:

$$S_1 + S_2 = S$$

$$W_R \leq \text{Max}(W_R)$$

$$W_c \leq \text{Max}(W_c)$$

Wherein J is the total number of calls that were processed by the callback queue, T is the threshold time, such that all calls with a duration of less than T are handled by the regular queue and all calls with a duration of greater than or equal to T are handled by the callback queue, $S_1$ is the number of agents dedicated to regular queue, $S_2$ is the number of agents dedicated to callback queue, S is the total number of agents, $W_R$ is the average wait time for the calls in the regular queue, $\text{Max}(W_R)$ is the tolerable average wait time for the regular queue, $W_C$ is the average wait time for the calls in the callback queue and $\text{Max}(W_C)$ is the tolerable average duration before callback.

A method of determining the optimal values for the variables T, $S_1$ and $S_2$ such that the total calls answered by the callback queue is reduced may be conducted using a simulated annealing algorithm. The simulated annealing algorithm may have the following steps:

| | |
|---|---|
| 1. | Begin with initial State P = {T, $S_1$, $S_2$} |
| 2. | Set an initial temperature t > 0 |
| 3. | While not yet frozen (i.e. t > 0) do the following |
| | 3.1. P' = select_neighbor(P, t) |
| | 3.2. Let Δ = cost(P') − cost(P) |
| | 3.3. If Δ < 0 (downhill move) |
| |     Set P = P' |
| | 3.4. If Δ > 0 (uphill move) |
| |     Set P = P' with probability $e^{-\Delta/t}$ |
| | 3.5. Set t = rt (reduce Temperature) |
| 4. | Return P |

Wherein P is a vector that represents the current state variables T, $S_1$ and $S_2$. Other algorithms for determining these values may also be performed within the scope of this disclosure.

The examples presented below depict simulations of optimal values for the variables T, $S_1$ and $S_2$ during periods of normal call activity and periods of high call activity.

EXAMPLE 1

Figure 5:
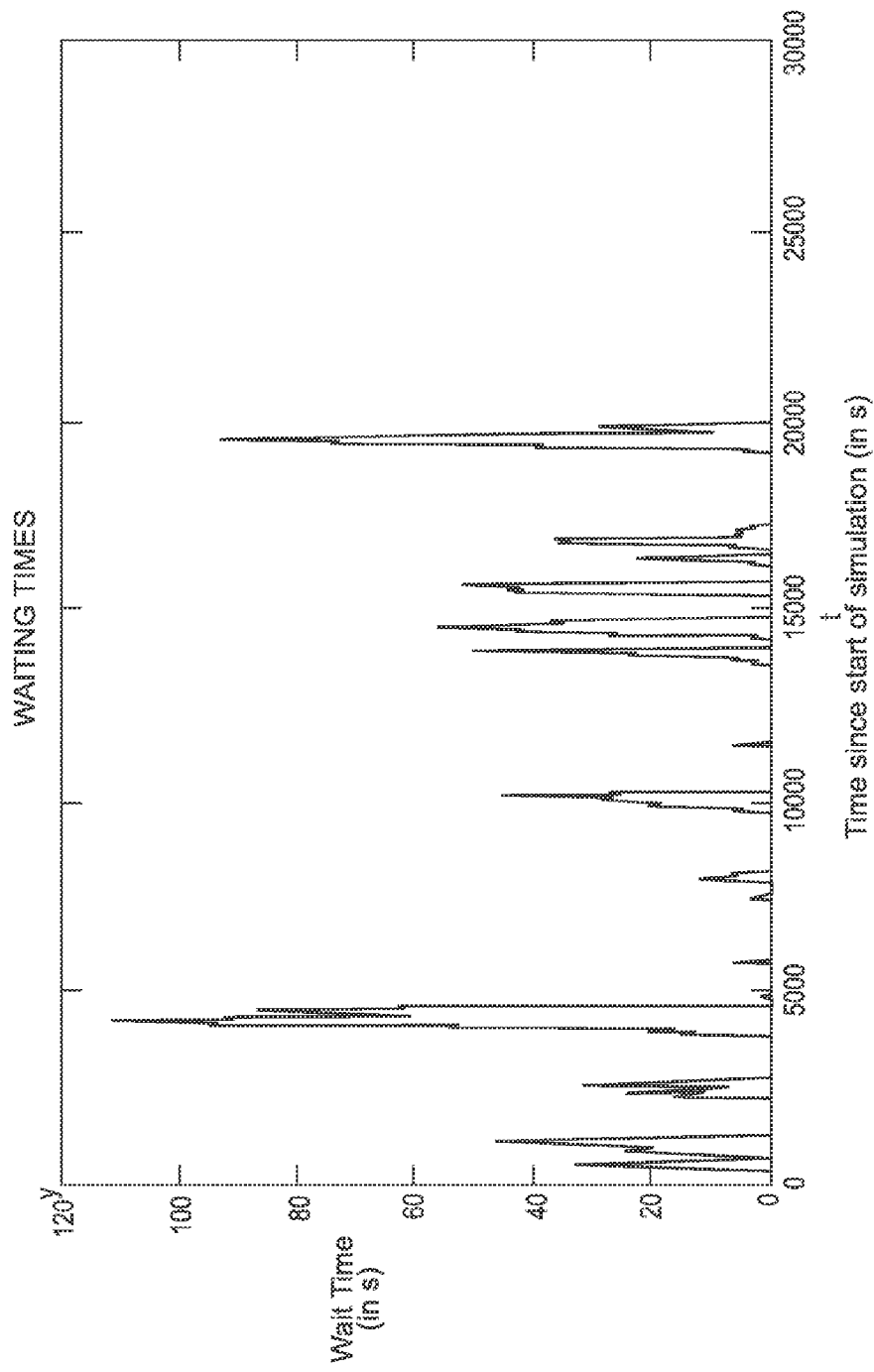
FIG. 5 depicts a graphical representation of a discrete simulation model of call wait times during periods of normal call activity.

During normal operation of the call center, calls may arrive as a Poisson process with a mean inter-arrival call duration of 7 seconds. A discrete event simulation model of the call center was conducted to determine that the average wait time was 4.5 seconds, as shown in FIG. 5.

When the dynamic queue split algorithm described herein is applied, the following output is returned:
T=15 minutes
$S_1$=60 agents
$S_2$=0 agents These numbers indicate that all calls are routed to the primary queue, and the callback queue is not used.

EXAMPLE 2

Figure 6:
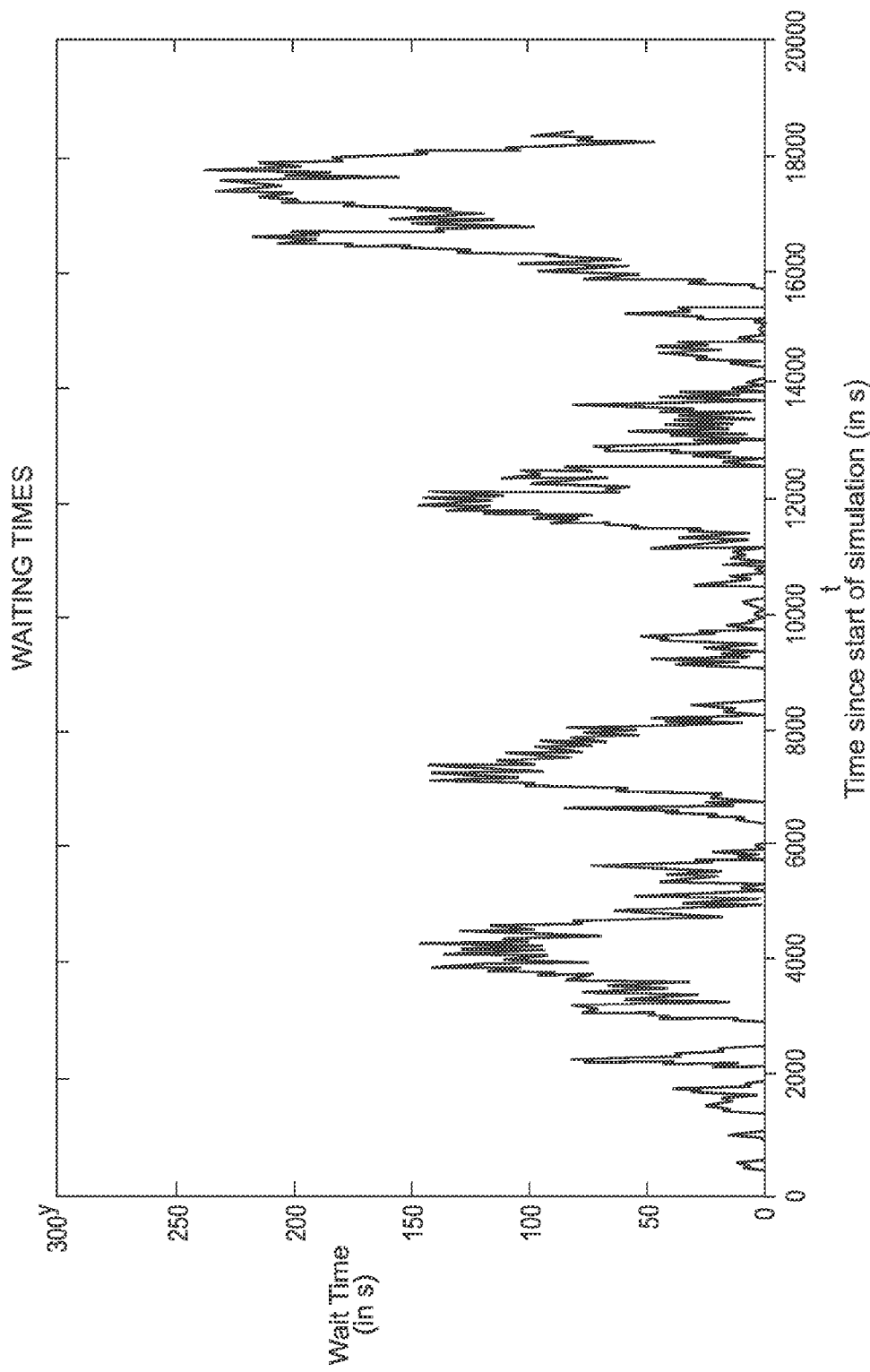
FIG. 6 depicts a graphical representation of a discrete simulation model of call wait times during periods of elevated call activity.

During periods of operation of the call center when call activity increases, calls may arrive as a Poisson process with a mean inter-arrival call duration of 6 seconds and thus the call may experience a higher delay in answering. The discrete event simulation model of the call center was conducted to determine that the average wait time increased to 45 seconds, as shown in FIG. 6.

By partitioning the calls into regular and call back queues, the following Quality of Service (QOS) parameters are defined for the algorithm mentioned herein:
Max($W_R$)=20 seconds (i.e. the tolerable average wait time for primary queue calls is 20 seconds)
Max($W_C$)=30 minutes (i.e. the tolerable average callback time for extended duration calls is 30 minutes)

When the algorithm is applied, the following results are found:
T=7.2 minutes
$S_1$=46 agents
$S_2$=14 agents Under this configuration, approximately 81% of the calls (whose anticipated service duration is less than 7.2 minutes) are placed into the primary queue. The remaining 19% of the calls are placed into the callback queue.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A method of routing calls in a call center, comprising:
forecasting, by call activity forecaster, an anticipated call volume for each of a plurality of time intervals, wherein the forecasting is based upon historic call volume information;
receiving, by a communication port in the call center, a plurality of calls;
for each of the plurality of calls:
determining, by a threshold comparator, a threshold time as an indication of a maximum service time for the call, wherein the threshold time is based upon at least:
a first time interval during which the call was received,
the forecasted anticipated call volume for the first time interval,
a number of agents in each of a plurality of queues, the agents being assigned to answer incoming calls, and
average wait times in each of the plurality of queues;

estimating, by a duration estimator, an expected service time for the call,
comparing, by the threshold comparator, the threshold time with the expected service time for the call, and
assigning, by a router, the call into one of the plurality of queues based upon the comparing;
prioritizing, by the router, the plurality of queues based upon the expected service time for each call in each of the plurality of queues;
directing, by the router, each call in a first queue of the plurality of queues to a first group of agents, wherein directing each call in the first queue of the plurality of queues to the first group of agents comprises determining a number of agents in the first group by a simulated annealing algorithm, wherein the simulated annealing algorithm comprises:

---
1. Begin with initial State $P = \{T, S_1, S_2\}$
2. Set an initial temperature $t > 0$
3. While not yet frozen (i.e. $t > 0$) do the following
   3.1. P' = select_neighbor(P, t)
   3.2. Let $\Delta$ = cost(P') − cost(P)
   3.3. If $\Delta < 0$ (downhill move)
       Set P = P'
   3.4. If $\Delta > 0$ (uphill move)
       Set P = P' with probability $e^{-\Delta/t}$
   3.5. Set t = rt (reduce Temperature)
4. Return P;
--- and
providing, by the communication port, a callback prompt to each call in a second queue of the plurality of queues, wherein a priority of the first queue is higher than a priority of the second queue.

2. The method of claim 1, further comprising:
directing a second group of agents to place a return call to each caller that placed the call assigned to the second queue.

3. The method of claim 2, wherein directing the second group of agents to place the return call comprises determining a number of agents in the second group by a dynamic queue split algorithm, wherein the dynamic queue split algorithm comprises:
Minimize $_{\{T, S1, S2\}}(J)$, subject to $$S_1 + S_2 = S$$

$$W_R \leq \text{Max}(W_R)$$

$$W_c \leq \text{Max}(W_c),$$

wherein T is the threshold time, S1 is the number of agents in the first group, S2 is a number of agents in a second queue, S is a total number of agents, WR is an average wait time in the first queue, Max(WR) is a tolerable average wait time for the first queue, WC is an average wait time for in the second queue and Max(WC) is a tolerable average duration before callback.

4. The method of claim 2, wherein directing the second group of agents to place the return call comprises determining a number of agents in the second group by a simulated annealing algorithm, wherein the simulated annealing algorithm comprises:

---
1. Begin with initial State $P = \{T, S_1, S_2\}$
2. Set an initial temperature $t > 0$
3. While not yet frozen (i.e. $t > 0$) do the following
   3.1. P' = select_neighbor(P, t)
   3.2. Let $\Delta$ = cost(P') − cost(P)
   3.3. If $\Delta < 0$ (downhill move)
       Set P = P'
   3.4. If $\Delta > 0$ (uphill move)
       Set P = P' with probability $e^{-\Delta/t}$
   3.5. Set t = rt (reduce Temperature)
4. Return P.
---

5. The method of claim 1, wherein estimating the expected service time further comprises:
using an interactive voice response system to obtain an input from a caller placing the call;
determining the nature of the call based upon the input;
comparing the nature of the call to a statistical database; and
based upon the comparing, estimating the expected service time for the call.

6. The method of claim 1, wherein determining the threshold time comprises using a dynamic queue split algorithm, wherein the dynamic queue split algorithm comprises:
Minimize $_{\{T, S1, S2\}}(J)$, subject to $$S_1 + S_2 = S$$

$$W_R \leq \text{Max}(W_R)$$

$$W_c \leq \text{Max}(W_c),$$

wherein T is the threshold time, S1 is the number of agents in the first group, S2 is a number of agents in a second queue, S is a total number of agents, WR is an average wait time in the first queue, Max(WR) is a tolerable average wait time for the first queue, WC is an average wait time for in the second queue and Max(WC) is a tolerable average duration before callback.

7. The method of claim 1, wherein determining the threshold time comprises using a simulated annealing algorithm, wherein the simulated annealing algorithm comprises:

---
1. Begin with initial State $P = \{T, S_1, S_2\}$
2. Set an initial temperature $t > 0$
3. While not yet frozen (i.e. $t > 0$) do the following
   3.1. P' = select_neighbor(P, t)
   3.2. Let $\Delta$ = cost(P') − cost(P)
   3.3. If $\Delta < 0$ (downhill move)
       Set P = P'
   3.4. If $\Delta > 0$ (uphill move)
       Set P = P' with probability $e^{-\Delta/t}$
   3.5. Set t = rt (reduce Temperature)
4. Return P.
---

8. The method of claim 1, wherein directing each call in the first queue of the plurality of queues to the first group of agents comprises determining a number of agents in the first group based, at least in part, on a total number of agents, the forecasted anticipated call volume for the first time interval, and an expected total service time for a plurality of calls received in the first time interval.

9. The method of claim 8, further comprising determining a number of agents in a second group based, at least in part, on a total number of agents, the forecasted anticipated call volume for the first time interval, a total volume of a plurality of calls received in the first time interval, and the number of agents in the first group.

10. The method of claim 1, wherein determining the threshold time further comprises confirming that each of the average wait times in each of the plurality of queues is less than or equal to a predetermined maximum wait time for each of the plurality of queues.

11. A method of routing calls in a call center, comprising:
forecasting, by call activity forecaster, an anticipated call volume for each of a plurality of time intervals, wherein the forecasting is based upon historic call volume information;
receiving, by a communication port in the call center, a plurality of calls;
for each of the plurality of calls:
  determining, by a threshold comparator, a threshold time as an indication of a maximum service time for the call, wherein the threshold time is based upon at least:
    a first time interval during which the call was received,
    the forecasted anticipated call volume for the first time interval,
    a number of agents in each of a plurality of queues, the agents being assigned to answer incoming calls, and
    average wait times in each of the plurality of queues;
  estimating, by a duration estimator, an expected service time for the call,
  comparing, by the threshold comparator, the threshold time with the expected service time for the call, and
  assigning, by a router, the call into one of the plurality of queues based upon the comparing;
prioritizing, by the router, the plurality of queues based upon the expected service time for each call in each of the plurality of queues;
directing, by the router, each call in a first queue of the plurality of queues to a first group of agents;
providing, by the communication port, a callback prompt to each call in a second queue of the plurality of queues, wherein a priority of the first queue is higher than a priority of the second queue; and
directing a second group of agents to place a return call to each caller that placed the call assigned to the second queue, wherein directing the second group of agents to place the return call comprises determining a number of agents in the second group by a simulated annealing algorithm, wherein the simulated annealing algorithm comprises:

---

1. Begin with initial State $P = \{T, S_1, S_2\}$
2. Set an initial temperature $t > 0$
3. While not yet frozen (i.e. $t > 0$) do the following
   3.1. P' = select_neighbor(P, t)
   3.2. Let $\Delta$ = cost(P') − cost(P)
   3.3. If $\Delta < 0$ (downhill move)
       Set P = P'
   3.4. If $\Delta > 0$ (uphill move)
       Set P = P' with probability $e^{-\Delta/t}$
   3.5. Set t = rt (reduce Temperature)
4. Return P.

---

12. The method of claim 11, wherein directing each call in the first queue of the plurality of queues to the first group of agents comprises determining a number of agents in the first group by a dynamic queue split algorithm, wherein the dynamic queue split algorithm comprises:
Minimize $_{\{T, S1, S2\}}(J)$, subject to $S_1 + S_2 = S$ $W_R \leq \text{Max}(W_R)$ $W_c \leq \text{Max}(W_c)$, wherein T is the threshold time, S1 is the number of agents in the first group, S2 is a number of agents in a second queue, S is a total number of agents, WR is an average wait time in the first queue, Max(WR) is a tolerable average wait time for the first queue, WC is an average wait time for in the second queue and Max(WC) is a tolerable average duration before callback.

13. The method of claim 11, wherein directing each call in the first queue of the plurality of queues to the first group of agents comprises determining a number of agents in the first group by a simulated annealing algorithm, wherein the simulated annealing algorithm comprises:

---

1. Begin with initial State $P = \{T, S_1, S_2\}$
2. Set an initial temperature $t > 0$
3. While not yet frozen (i.e. $t > 0$) do the following
   3.1. P' = select_neighbor(P, t)
   3.2. Let $\Delta$ = cost(P') − cost(P)
   3.3. If $\Delta < 0$ (downhill move)
       Set P = P'
   3.4. If $\Delta > 0$ (uphill move)
       Set P = P' with probability $e^{-\Delta/t}$
   3.5. Set t = rt (reduce Temperature)
4. Return P.

---

14. The method of claim 11, wherein estimating the expected service time further comprises:
using an interactive voice response system to obtain an input from a caller placing the call;
determining the nature of the call based upon the input;
comparing the nature of the call to a statistical database; and
based upon the comparing, estimating the expected service time for the call.

15. The method of claim 11, wherein determining the threshold time comprises using a dynamic queue split algorithm, wherein the dynamic queue split algorithm comprises:
Minimize $_{\{T, S1, S2\}}(J)$, subject to $S_1 + S_2 = S$ $W_R \leq \text{Max}(W_R)$ $W_c \leq \text{Max}(W_c)$, wherein T is the threshold time, S1 is the number of agents in the first group, S2 is a number of agents in a second queue, S is a total number of agents, WR is an average wait time in the first queue, Max(WR) is a tolerable average wait time for the first queue, WC is an average wait time for in the second queue and Max(WC) is a tolerable average duration before callback.

16. The method of claim 11, wherein determining the threshold time comprises using a simulated annealing algorithm, wherein the simulated annealing algorithm comprises:

---

1. Begin with initial State $P = \{T, S_1, S_2\}$
2. Set an initial temperature $t > 0$
3. While not yet frozen (i.e. $t > 0$) do the following
   3.1. P' = select_neighbor(P, t)
   3.2. Let $\Delta$ = cost(P') − cost(P)
   3.3. If $\Delta < 0$ (downhill move)
       Set P = P'
   3.4. If $\Delta > 0$ (uphill move)
       Set P = P' with probability $e^{-\Delta/t}$
   3.5. Set t = rt (reduce Temperature)
4. Return P.

---

17. The method of claim 11, wherein directing each call in the first queue of the plurality of queues to the first group of agents comprises determining a number of agents in the first group based, at least in part, on a total number of agents, the forecasted anticipated call volume for the first time interval, and an expected total service time for a plurality of calls received in the first time interval.

18. The method of claim 17, further comprising determining a number of agents in a second group based, at least in part, on a total number of agents, the forecasted anticipated call volume for the first time interval, a total volume of a plurality of calls received in the first time interval, and the number of agents in the first group.

19. The method of claim 11, wherein determining the threshold time further comprises confirming that each of the average wait times in each of the plurality of queues is less than or equal to a predetermined maximum wait time for each of the plurality of queues.

20. A method of routing calls in a call center, comprising:
  forecasting, by call activity forecaster, an anticipated call volume for each of a plurality of time intervals, wherein the forecasting is based upon historic call volume information;
  receiving, by a communication port in the call center, a plurality of calls;
  for each of the plurality of calls:
    determining, by a threshold comparator, a threshold time as an indication of a maximum service time for the call, wherein the threshold time is based upon at least:
      a first time interval during which the call was received,
      the forecasted anticipated call volume for the first time interval,
      a number of agents in each of a plurality of queues, the agents being assigned to answer incoming calls, and
      average wait times in each of the plurality of queues,
    wherein determining the threshold time comprises using a simulated annealing algorithm, wherein the simulated annealing algorithm comprises:

```
1. Begin with initial State P = {T, S₁, S₂}
2. Set an initial temperature t > 0
3. While not yet frozen (i.e. t > 0) do the following
   3.1. P' = select_neighbor(P, t)
   3.2. Let Δ = cost(P') − cost(P)
   3.3. If Δ < 0 (downhill move)
        Set P = P'
   3.4. If Δ > 0 (uphill move)
        Set P = P' with probability e-Δ/t
   3.5. Set t = rt (reduce Temperature)
4. Return P,
``` estimating, by a duration estimator, an expected service time for the call,
    comparing, by the threshold comparator, the threshold time with the expected service time for the call, and
    assigning, by a router, the call into one of the plurality of queues based upon the comparing;
  prioritizing, by the router, the plurality of queues based upon the expected service time for each call in each of the plurality of queues;
  directing, by the router, each call in a first queue of the plurality of queues to a first group of agents; and
  providing, by the communication port, a callback prompt to each call in a second queue of the plurality of queues, wherein a priority of the first queue is higher than a priority of the second queue.

21. The method of claim 20, further comprising:
  directing a second group of agents to place a return call to each caller that placed the call assigned to the second queue.

22. The method of claim 20, wherein directing each call in the first queue of the plurality of queues to the first group of agents comprises determining a number of agents in the first group by a dynamic queue split algorithm, wherein the dynamic queue split algorithm comprises:
  Minimize $_{\{T, S1, S2\}}(J)$, subject to $S_1 + S_2 = S$ $W_R \leq \text{Max}(W_R)$ $W_c \leq \text{Max}(W_c)$, wherein T is the threshold time, S1 is the number of agents in the first group, S2 is a number of agents in a second queue, S is a total number of agents, WR is an average wait time in the first queue, Max(WR) is a tolerable average wait time for the first queue, WC is an average wait time for in the second queue and Max(WC) is a tolerable average duration before callback.

23. The method of claim 20, wherein directing each call in the first queue of the plurality of queues to the first group of agents comprises determining a number of agents in the first group by a simulated annealing algorithm, wherein the simulated annealing algorithm comprises:

```
1. Begin with initial State P = {T, S₁, S₂}
2. Set an initial temperature t > 0
3. While not yet frozen (i.e. t > 0) do the following
   3.1. P' = select_neighbor(P, t)
   3.2. Let Δ = cost(P') − cost(P)
   3.3. If Δ < 0 (downhill move)
        Set P = P'
   3.4. If Δ > 0 (uphill move)
        Set P = P' with probability e-Δ/t
   3.5. Set t = rt (reduce Temperature)
4. Return P.
```

24. The method of claim 21, wherein directing the second group of agents to place the return call comprises determining a number of agents in the second group by a dynamic queue split algorithm, wherein the dynamic queue split algorithm comprises:
  Minimize $_{\{T, S1, S2\}}(J)$, subject to $S_1 + S_2 = S$ $W_R \leq \text{Max}(W_R)$ $W_c \leq \text{Max}(W_c)$, wherein T is the threshold time, S1 is the number of agents in the first group, S2 is a number of agents in a second queue, S is a total number of agents, WR is an average wait time in the first queue, Max(WR) is a tolerable average wait time for the first queue, WC is an average wait time for in the second queue and Max(WC) is a tolerable average duration before callback.

25. The method of claim 21, wherein directing the second group of agents to place the return call comprises determining a number of agents in the second group by a simulated annealing algorithm, wherein the simulated annealing algorithm comprises:

```
1. Begin with initial State P = {T, S₁, S₂}
2. Set an initial temperature t > 0
```

-continued

```
3. While not yet frozen (i.e. t > 0) do the following
   3.1. P' = select_neighbor(P, t)
   3.2. Let Δ = cost(P') – cost(P)
   3.3. If Δ < 0 (downhill move)
       Set P = P'
   3.4. If Δ > 0 (uphill move)
       Set P = P' with probability e-Δ/t
   3.5. Set t = rt (reduce Temperature)
4. Return P.
```

26. The method of claim 20, wherein estimating the expected service time further comprises:
using an interactive voice response system to obtain an input from a caller placing the call;
determining the nature of the call based upon the input;
comparing the nature of the call to a statistical database; and
based upon the comparing, estimating the expected service time for the call.

27. The method of claim 20, wherein directing each call in the first queue of the plurality of queues to the first group of agents comprises determining a number of agents in the first group based, at least in part, on a total number of agents, the forecasted anticipated call volume for the first time interval, and an expected total service time for a plurality of calls received in the first time interval.

28. The method of claim 27, further comprising determining a number of agents in a second group based, at least in part, on a total number of agents, the forecasted anticipated call volume for the first time interval, a total volume of a plurality of calls received in the first time interval, and the number of agents in the first group.

29. The method of claim 20, wherein determining the threshold time further comprises confirming that each of the average wait times in each of the plurality of queues is less than or equal to a predetermined maximum wait time for each of the plurality of queues.

30. A system for routing calls, comprising:
a processor;
a non-transitory, processor-readable storage medium in operable communication with the processor;
a duration estimator in operable communication with the processor;
a call activity forecaster in operable communication with the processor;
a router in operable communication with the processor, wherein the router comprises a threshold comparator;
wherein the storage medium comprises one or more programming instructions that, when executed, cause the processor to:
direct the call activity forecaster to forecast an anticipated call volume for each of a plurality of time intervals, wherein the forecasting is based upon historic call volume information;
direct the communication port to receive a plurality of calls;
for each of the plurality of calls:
direct the threshold comparator to determine a threshold time as an indication of a maximum service time for the call, wherein the threshold time is based upon at least:
a first time interval during which the call was received,
the forecasted anticipated call volume for the first time interval,
a number of agents in each of a plurality of queues, the agents being assigned to answer incoming calls, and
average wait times in each of the plurality of queues,
wherein the threshold time is determined based on the use of a simulated annealing algorithm, wherein the simulated annealing algorithm comprises:

```
1. Begin with initial State P = {T, S₁, S₂}
2. Set an initial temperature t > 0
3. While not yet frozen (i.e. t > 0) do the following
   3.1. P' = select_neighbor(P, t)
   3.2. Let Δ = cost(P') – cost(P)
   3.3. If Δ < 0 (downhill move)
       Set P = P'
   3.4. If Δ > 0 (uphill move)
       Set P = P' with probability e-Δ/t
   3.5. Set t = rt (reduce Temperature)
4. Return P,
``` direct the duration estimator to estimate an expected service time for the call,
direct the threshold comparator to compare the threshold time with the expected service time for the call, and
direct the router to assign the call into one of the plurality of queues based upon the comparing;
direct the router to prioritize the plurality of queues based upon the expected service time for each call in each of the plurality of queues;
direct, using the router, each call in a first queue of the plurality of queues to a first group of agents; and
direct the communication port to provide a callback prompt to each call in a second queue of the plurality of queues, wherein a priority of the first queue is higher than a priority of the second queue.

31. The system of claim 30, wherein the storage medium comprises one or more programming instructions that, when executed, further cause the processor to:
cause an interactive voice response system to obtain an input from each caller that placed the call assigned to the second queue;
determine the nature of each call based upon the input;
compare the nature of each call to a statistical database; and
based upon the comparing, estimate the expected service time for each call.

32. A system for routing calls, comprising:
a processor;
a non-transitory, processor-readable storage medium in operable communication with the processor;
a duration estimator in operable communication with the processor;
a call activity forecaster in operable communication with the processor;
a router in operable communication with the processor, wherein the router comprises a threshold comparator; and
a communications port in operable communication with the processor;
wherein the storage medium comprises one or more programming instructions that, when executed, cause the processor to:
direct the call activity forecaster to forecast an anticipated call volume for each of a plurality of time intervals, wherein the forecasting is based upon historic call volume information;

direct the communications port to receive a plurality of calls;

for each of the plurality of calls:
  direct the threshold comparator to determine a threshold time as an indication of a maximum service time for the call, wherein the threshold time is based upon at least:
    a first time interval during which the call was received,
    the forecasted anticipated call volume for the first time interval,
    a number of agents in each of a plurality of queues, the agents being assigned to answer incoming calls, and
    average wait times in each of the plurality of queues,
  wherein the threshold time is determined based on the use of a simulated annealing algorithm, wherein the simulated annealing algorithm comprises:

---

1. Begin with initial State P = {T, $S_1$, $S_2$}
2. Set an initial temperature t > 0
3. While not yet frozen (i.e. t > 0) do the following
  3.1. P' = select_neighbor(P, t)
  3.2. Let Δ = cost(P') − cost(P)
  3.3. If Δ < 0 (downhill move)
    Set P = P'
  3.4. If Δ > 0 (uphill move)
    Set P = P' with probability $e^{-\Delta/t}$
  3.5. Set t = rt (reduce Temperature)
4. Return P,

--- cause an interactive voice response system to obtain an input from a callers placing the call,
  determine the nature of the call based upon the input,
  compare the nature of the call to a statistical database,
  based upon the comparing, estimate an expected service time for the call,
  compare the threshold time to the expected service time, and
  direct the router to assign the call into one of the plurality of queues;
prioritize the plurality of queues based upon the expected service time for each call in each queue;
direct each call in a first queue of the plurality of to a first group of agents; and
direct the communications port to provide a callback prompt to each call in a second queue of the plurality of queues, wherein a priority of the first queue is higher than a priority of the second queue.

* * * * *